July 26, 1966  J. L. GREGG  3,262,314
METHOD AND MEANS FOR TESTING THERMOSTAT OPERATION
Filed Aug. 8, 1963

INVENTOR.
James L. Gregg
BY
Robert E. Fowler
ATTORNEY

United States Patent Office 3,262,314
Patented July 26, 1966

3,262,314
METHOD AND MEANS FOR TESTING THERMOSTAT OPERATION
James L. Gregg, Russiaville, Ind., assignor to General Motors Corporation, Detroit, Mich., a corporation of Delaware
Filed Aug. 8, 1963, Ser. No. 300,860
5 Claims. (Cl. 73—342)

This invention relates to a method and means for testing the operation of an automotive thermostat in the cooling system of an internal combustion engine without the necessity of removing the thermostat from its housing or mounting. In the past it has been necessary in order to test thermostats used to control the flow of fluid through the cooling system of an automotive engine to remove the thermostat. After removal, the thermostat when cool was placed in a container of water or other liquid and then the temperature of the liquid was increased until the thermostat valve opened, the operator noting the temperature at opening. Through the use of this method only the opening temperature was obtained and no other operating characteristics were obtained. It required removal from the car. There are other operating characteristics which aid in ascertaining whether the thermostat is satisfactorily performing its duty and which are desirable. These are the leakage rate or how much fluid leaks through the thermostat when it is supposedly closed, and the regulating temperature or that temperature in the cooling system which is maintained by the thermostat after warm up. Obviously these characteristics cannot be determined by the present method.

It is, therefore, an object in making this invention to provide means for testing various operating characteristics of an automotive thermostat in place in the vehicle without removal.

It is a further object in making this invention to provide means applicable to an automotive vehicle for testing the operation of an automotive thermostat by normally operating the engine and its cooling system.

It is a still further object in making this invention to provide a method of testing an automotive thermostat in place by normal operation of the engine.

With these and other objects in view which will become apparent as the specification proceeds, my invention will be best understood by reference to the following specification and claims and the illustrations in the accompanying drawings, in which:

As previously mentioned, one of the main advantages of the present test equipment is that it can be applied to the car and the car operated normally to check the thermostat without removing the thermostat. To do this it is necessary to determine the temperature at two different places throughout the test, one being in the engine block and the other the radiator coolant temperature. Two probes are, therefore, provided in both of which there is located a thermistor which is a resistance whose value changes with temperature variation. One probe is so constructed that it can be applied to the engine block. The second probe is so constructed as to be applied to the upper portion of the radiator. Before going into a detailed description of the probes and circuit, it may be pointed out that there is always provided in the engine block a temperature sensitive element which acts as a control means for the temperature indicator on the instrument panel for the driver. The operator, therefore, first removes from the block the temperature sensitive element for the engine heat indicator, inserting in its place the probe of the testing equipment. He then removes the radiator cap and inserts the second probe which projects down into the water or cooling liquid in the upper portion of the radiator. With these two elements in place the engine of the car is started from cold condition and through the system to be described the desired characteristics of the thermostat are determined.

Figure 1:
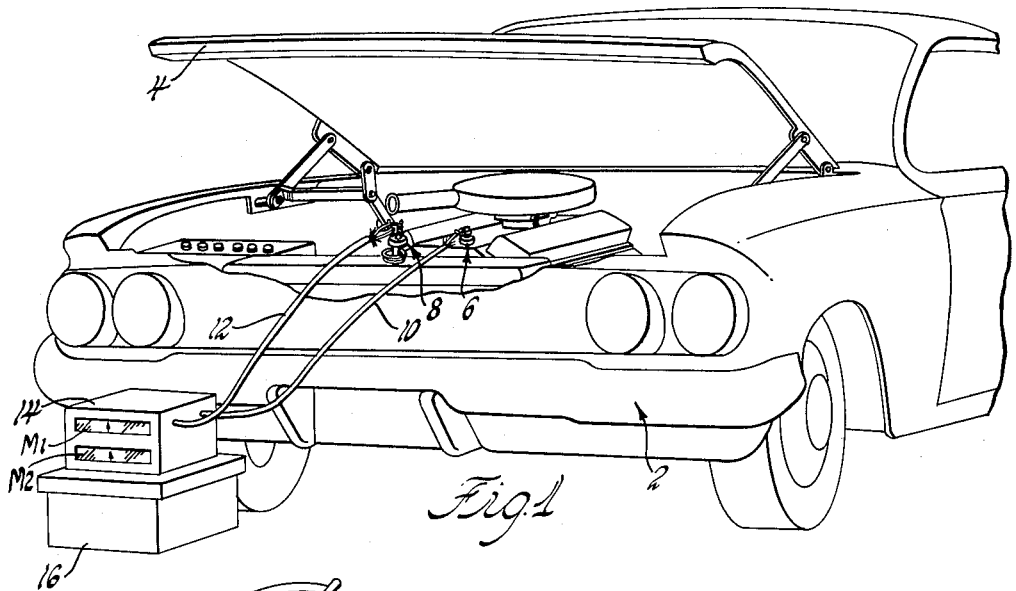
FIGURE 1 is a perspective view of test equipment embodying the invention as applied to an automotive vehicle.

Referring now particularly to FIG. 1, there is shown therein an automobile 2 with its hood 4 in raised position and the engine block probe 6 inserted in the location of the normal engine temperature indicator. The second radiator temperature probe 8 is shown inserted in the top of the radiator. Both of these probes are connected by cables 10 and 12, respectively, with the test unit 14 shown supported on any suitable means, such as a box 16, shown located in front of the car.

Figure 2:
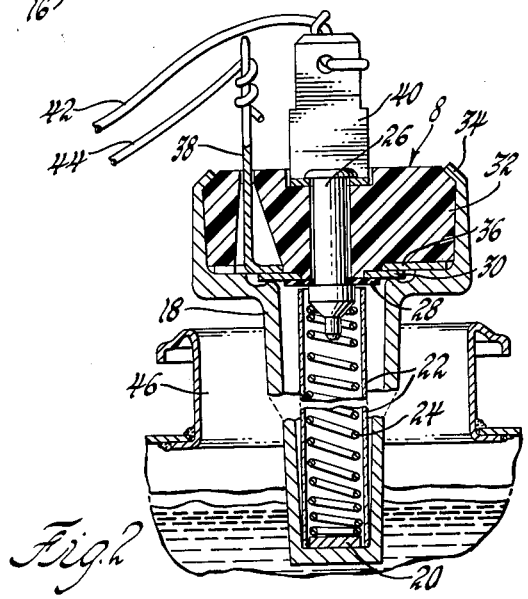
FIG. 2 is an enlarged vertical section taken through the probe of the system applied to the radiator of the car.

FIG. 2 discloses specifically the probe used for insertion in the neck of the radiator. This probe consists of an elongated casing 18 of generally small cylindrical form which is hollow and supports at its lower end a thermistor 20. An insulating sleeve 22 of the approximately inner diameter of the lower end of the casing surrounds the thermistor and extends to the upper end of the casing 18. A spring 24 presses the thermistor downwardly upon complete assembly and holds it in firm position in the bottom of the probe, the lower face of the thermistor being in electrical contact with the inner face of the casing. A central metallic contact pin 26 projects downwardly into the center of the upper end of the spring 24 to compress the same and this is held in place by a plurality of washers 28 and 30 which force it downwardly when a plastic insulating disc 32 is inserted in the upper enlarged end of the probe and the outer edge 34 rolled over to secure all of the parts together. The washer 30 is metallic and fits across the upper end of the central opening. The washer 28 is Neoprene and fits on a shoulder on pin 26 to seal the assembly against liquid leaking into the central chamber. A metal contact member 36 with an upturned flange 38 which projects through an opening in the disc 32 engages the sides of the casing and enables electrical connection to be made to the casing and to the lower face of the thermistor 20. A contact lug 40 is secured by riveting to the upper end of the contact 26 to make electrical contact to the upper face of the thermistor. Each of these connectors are then connected to lines, such as 42 and 44, to connect the thermistor into the circuit. The probe can then be inserted in the radiator neck 46 where it is supported for test purposes.

Figure 3:
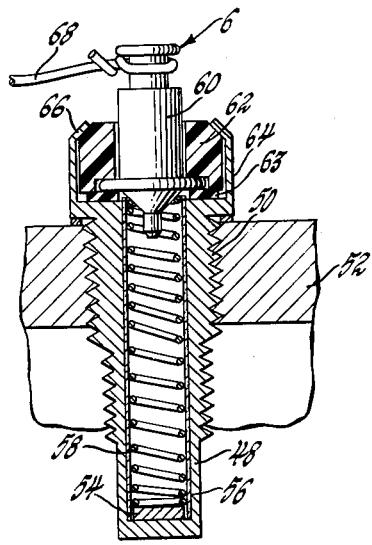
FIG. 3 is a sectional view taken through the probe applied to the engine block; and, FIG. 4 is a circuit diagram of the electrical connections used in the test system.

FIG. 3 shows the probe used on the engine block. This is very similar to the first probe but in this case only one electrical connection is necessary since a good ground connection is obtained in the block as one side of the line. A ground connection from point 76 to the frame must be made with a grounding clip which is provided. In this case the hollow probe housing 48 is threaded as shown at 50 to fit into the threaded opening in the engine block 52 from which the engine temperature indicator has been removed. Again a thermistor 54 is mounted in the lower end of the central cavity of the probe. It is surrounded by an insulating sleeve 56 which extends to the upper end and is held in that position by a compression spring 58 which is loaded upon insertion of the upper metallic pin contact member 60 held in place by a plastic insulating disc 62 supported in the enlarged upper end of the casing 64 by rolling over the edges 66. A Neoprene disc 63 holds the insulating member 62 down and seals the unit against moisture. Electrical contact is then made to the thermistor through a wire or line 68, through the pin contact 60 down through the spring 58 to the upper face of the thermistor, thence from the bottom face of the thermistor through the casing 48 to ground in the block.

Figure 4:
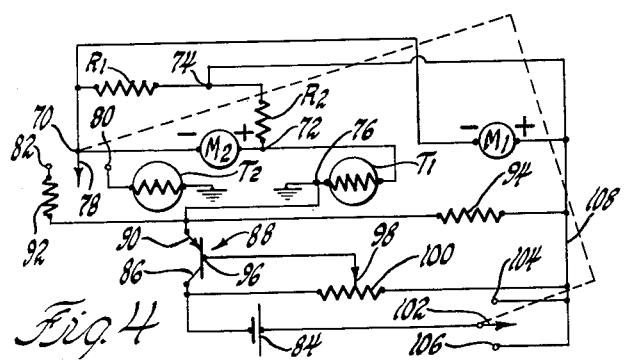

It is desired to determine through these temperature sensitive devices together with their attendant circuitry three things: (1) the amount of leakage or the amount of water which the thermostat valve passes when supposedly closed; (2) the opening temperature, and (3) the regulation temperature or that temperature at which the thermostat maintains the overall temperature of the engine after it has warmed up. In order to obtain these values the thermistors in the probes are connected into a Wheatstone bridge measuring circuit such as that shown in FIG. 4. The two thermistors in this circuit diagram are identified as $T_1$ and $T_2$, $T_2$ being the thermistor in the probe applied to the engine block and $T_1$ that in the probe inserted in the radiator. The other two arms of the bridge are formed by two resistances $R_1$ and $R_2$. The bridge output, therefore, appears across points 70 and 72 while the input is applied to the bridge across points 74, 76. In the arm including thermistor $T_2$ there is included a switch consisting of movable arm 78 and stationary contact 80. Movable arm 78 also engages a stationary contact 82 for adjustment purposes to be described.

A battery or other suitable source of power 84 is connected to the collector electrode 86 of an amplifying transistor 88 whose emitter electrode 90 is connected to input point 76 on the bridge and to a point intermediate two resistors 92 and 94. The base electrode 96 of the transistor 88 is connected to a movable tap 98 on resistor 100 to apply an adjustable potential to the transistor and thus regulate the voltage applied to the bridge. A second movable switch arm 102 which is simultaneously movable with switch arm 78 moves between two stationary contacts 104 and 106. Both of these contacts are connected to a power line 108 which when the switch arm 102 is in contact with either one applies a positive potential to this line and to input point 74 on the bridge. Likewise connected between power line 108 and output point 70 on the bridge is an ammeter $M_1$. This connection is used for determining the engine operating temperature at any time. A second ammeter $M_2$ is connected across the output of the bridge and is used for determining the temperature difference between that in the engine block and that in the liquid in the radiator. This determines the leakage and the opening temperature.

With the switches 78, 102 on their lefthand and lower positions, respectively, the circuit is in position for calibration. The value of the resistor 92 is selected so that the ammeter $M_1$ should read 170° on the scale. The adjustable cap 98 is moved back and forth on the resistor 100 until this reading is established. The device is now ready for operation. Switches 78 and 102 are moved to their righthand and upper positions, respectively, and after insertion of the probes in the proper places the automobile engine is started from cold condition. As it begins to warm up, ammeter $M_1$ should begin to show a reading and it will read directly in terms of temperature of the block. Ammeter $M_2$ reads the difference between the temperatures of the radiator coolant and that in the engine block. It will begin to read and will read higher and higher as the engine block warms up but the radiator temperature stays cool to indicate an increasing temperature difference. At the point where the thermostat opens there will be a sudden drop in the reading of $M_2$ since the hot water in the engine rushes in to mix with the radiator water decreasing the temperature difference. At that instant the ammeter $M_1$ reads the opening temperature of the thermostat. The higher the reading on $M_2$ became during the test, showing the difference in temperatures, the less leakage through the thermostat occurred and, therefore, the better sealing of the same. On continued operation of the engine the regulating temperature can be read directly on ammeter $M_1$ after the whole system has stabilized. After the test has been run, of course, it is only necessary to replace the radiator cap and the temperature indicator sensor and the engine is in normal operation again.

What is claimed is:

1. In testing means, a first temperature responsive resistance element adapted to be mounted on an internal combustion engine block, a second temperature responsive resistance element adapted to be supported in the fluid in the radiator of a vehicle, a bridge circuit in which the first and second temperature responsive resistances form two of the arms, said bridge circuit having an input and an output circuit, a source of electrical voltage connected across the input circuit of the bridge, current indicating means connected across the output circuit of the bridge, a second current indicating means connected between the source of electrical voltage and the output circuit of the bridge so that the first current indicating means will indicate the difference in temperature between the engine block and radiator fluid and the second current indicating means will indicate the temperature in the fluid in the engine block, a resistor of known value connected in shunt circuit with the temperature responsive resistance element adapted to be mounted on the engine block, and switching means connected to the resistor of known value and the temperature responsive resistance element to alternately connect one or the other in circuit for purposes of calibrating the second current indicating means.

2. In testing means, a first temperature responsive resistance element adapted to be mounted on an internal combustion engine block, a second temperature responsive resistance element adapted to be supported in the fluid in the radiator of a vehicle, a bridge circuit in which the first and second temperature responsive resistances form two of the arms, said bridge circuit having an input and an output circuit, a source of electrical voltage connected across the input circuit of the bridge, current indicating means connected across the output circuit of the bridge, a second current indicating means connected between the source of electrical voltage and the output circuit of the bridge so that the first current indicating means will indicate the difference in temperature between the engine block and radiator fluid and the second current indicating means will indicate the temperature in the fluid in the engine block, a resistor of known value connected in shunt circuit with the temperature responsive resistance element adapted to be mounted on the engine block, switching means connected to the resistor of known value and the temperature responsive resistance element to alternately connect one or the other in circuit for purposes of calibrating the second current indicating means, and means for amplifying and varying the electrical voltage connected between the source of electrical voltage and the bridge input circuit.

3. In testing means, a first temperature responsive resistance element adapted to be mounted on an internal combustion engine block, a second temperature responsive resistance element adapted to be supported in the fluid in the radiator of a vehicle, a bridge circuit in which the first and second temperature responsive resistances form two of the arms, said bridge circuit having an input and an output circuit, a source of electrical voltage connected across the input circuit of the bridge, current indicating means connected across the output circuit of the bridge, a second current indicating means connected between the source of electrical voltage and the output circuit of the bridge so that the first current indicating means will indicate the difference in temperature between the engine block and radiator fluid and the second curret indicating means will indicate the temperature in the fluid in the engine block, a resistor of known value connected in shunt circuit with the temperature responsive resistance element adapted to be mounted on the engine block, switching means connected to the resistor of known value and the temperature responsive resistance element to alternately connect one or the other in circuit for purposes of calibrating the second current indicating means, and means for amplifying and varying the electrical voltage connected between the source of electrical voltage and the bridge input circuit, said last-named means including transistor amplifying means and potentiometer means.

4. A method of testing the operation of a thermostat for controlling the flow of coolant fluid in an internal combustion engine and radiator comprising the steps of removing the temperature sensitive device in the engine block for the heat indicator and inserting a temperature sensitive probe for measuring engine temperatures, removing the radiator cap, inserting a second temperature sensitive probe in the radiator for measuring radiator coolant temperatures, starting the engine from cold condition and running it, determining the temperature difference between the block temperature and the radiator coolant temperature until a maximum temperature difference is reached determining the block temperatures at this point which indicate the temperature at which the thermostat opens and lets the coolant circulate to reduce the temperature difference.

5. A method of testing the operation of a thermostat for controlling the flow of coolant fluid in an internal combustion engine and radiator comprising the steps of removing the temperature sensitive device in the engine block for the heat indicator and inserting a temperature sensitive probe for measuring engine temperatures, removing the radiator cap, inserting a second temperature sensitive probe in the radiator for measuring radiator coolant temperatures, starting the engine from cold condition and running it, determining the temperature difference between the block temperature and the radiator coolant temperature until a maximum temperature difference is reached determining the block temperatures at this point which indicate the temperature at which the thermostat opens and lets the coolant circulate to reduce the temperature difference, continuing to run the engine after the thermostat opens until the overall temperature stabilizes, then determining the operating block temperature of normal operation.

References Cited by the Examiner

UNITED STATES PATENTS 2,947,938   8/1960   Bennett _____ 324—62
2,976,729   3/1961   Smith _____ 73—342

LOUIS R. PRINCE, *Primary Examiner.*

DONN McGIEHAN, *Assistant Examiner.*